US012559041B2

(12) United States Patent
Christian

(10) Patent No.: US 12,559,041 B2
(45) Date of Patent: Feb. 24, 2026

(54) CANTILEVER DISPLACEMENT CARGO CARRIER WITH ADJUSTABLE BEARING SLIDE

(71) Applicant: Brad Christian, San Clemente, CA (US)

(72) Inventor: Brad Christian, San Clemente, CA (US)

( * ) Notice: Subject to any disclaimer, the term of this patent is extended or adjusted under 35 U.S.C. 154(b) by 249 days.

(21) Appl. No.: 18/397,956

(22) Filed: Dec. 27, 2023

(65) Prior Publication Data

US 2024/0208430 A1 Jun. 27, 2024

Related U.S. Application Data

(63) Continuation-in-part of application No. 17/477,219, filed on Sep. 16, 2021, now Pat. No. 11,858,404, which is a continuation-in-part of application No. 14/999,844, filed on Jul. 8, 2016, now Pat. No. 11,124,106.

(51) Int. Cl.
| | |
|---|---|
| *B60R 9/06* | (2006.01) |
| *B60R 9/10* | (2006.01) |
| *B62D 43/02* | (2006.01) |
| *B66F 3/24* | (2006.01) |

(52) U.S. Cl.
CPC .................. *B60R 9/06* (2013.01); *B60R 9/10* (2013.01); *B62D 43/02* (2013.01); *B66F 3/24* (2013.01)

(58) Field of Classification Search
CPC ..... B60P 1/4471; B60P 1/4414; B60P 1/4485; B60P 1/483; B60P 1/5423; B60R 9/06; B60R 9/10; B66F 7/16; B66F 7/28; B66F 9/18; F16B 19/02; F16B 13/068; F16B 13/0816; F16B 2/14; F16B 12/20; F16B 12/2027; F16B 12/2036; F16B 12/32; B25B 13/18; B25B 13/24; E02F 9/2825
USPC ............................. 411/75, 76, 77, 78, 79, 80
See application file for complete search history.

(56) References Cited

U.S. PATENT DOCUMENTS

| | | | |
|---|---|---|---|
| 5,544,799 A * | 8/1996 | Didlake | B60R 9/06 |
| | | | 224/523 |
| 2015/0224837 A1* | 8/2015 | Anyan | B60R 9/06 |
| | | | 280/504 |
| 2018/0345744 A1* | 12/2018 | Rodriguez | B60R 9/06 |
| 2019/0168680 A1* | 6/2019 | Mehlen | B60R 9/06 |

* cited by examiner

*Primary Examiner* — Glenn F Myers
(74) *Attorney, Agent, or Firm* — Gray Law Firm; Gordon E. Gray, III

(57) ABSTRACT

The present invention is a cantilever displacement cargo carrier with an adjustable bearing slide. It has a beam with a first end and a second end, where the first end comprises a cantilever displacement housing with a pivot hole. The carrier has a pivot beam with a first end having a pivot bushing and a slide compartment where an upper adjustable bearing slide is in contact with a lower adjustable bearing slide. The upper adjustable bearing slide has two pin saddles and the lower adjustable bearing slide has a threaded adjusting bolt receiver. A horizontal bearing pin with a plurality of roller bearings is inserted into the two pin saddles. An adjusting bolt is inserted into the threaded adjusting bolt receiver. A pivot pin is inserted into the pivot hole and the pivot bushing.

12 Claims, 17 Drawing Sheets

CANTILEVER DISPLACEMENT CARGO CARRIER WITH ADJUSTABLE BEARING SLIDE

This is a continuation-in-part application of Ser. No. 17/477,219, filed Sep. 16, 2021, now issued as U.S. Pat. No. 11,858,404, which is a continuation-in-part application of Ser. No. 14/999,844, filed Jul. 8, 2016, now issued as U.S. Pat. No. 11,124,106. Said patent applications are incorporated herein by reference in their entirety.

TECHNICAL FIELD

The present invention is a vehicle cargo carrier apparatus. More specifically, the present invention relates to devices and methods for weight equalization of a cargo carrier where weight is applied to a swinging cantilever beam/arm.

BACKGROUND ART

The need for an automotive vehicle to be outfitted to accommodate additional cargo is extremely popular and can be used for work, recreation or other necessities. Generally, a cargo carrier is a device connected in some way to a vehicle's frame, body or trailer hitch receiver using a fixed structure for carrying cargo.

Over the years, the vehicle cargo carrier has evolved and incorporated complex features. One feature is the ability to swing the cargo out and away from the vehicle on a rotating beam that is anchored to a fixed beam with pivot axis on one side of the beam and the other side of the beam is free to rotate with the cargo carrier, e.g. a platform, attached. This feature is becoming more popular because it provides access to a vehicle's rear door, compartments or other devices.

However, in prior art swinging arm cargo carriers, when the pivoting beam loaded with the weight of its cargo is rotated out and away from the fixed beam, this action creates cantilever weight. The cantilever weight is transferred to the pivoting axis. As the cargo becomes heavier, so does the cantilever weight of the beam applied to the pivoting axis. This increased cantilever weight can have undesirable effects on the carrier such as increased friction and increased stress to the pivoting axis that can cause excessive wear, deformation, metal fatigue and failure.

It is desirable to address the issues of stress and friction to the pivoting axis point and, therefore, reduce the failure and/or wear on the pivoting axis and reduce the cantilever weight or compensate for the weight applied.

Another issue with cargo carriers that utilize a vehicle's trailer hitch towing receiver is that by mounting a prior art cargo carrier to the vehicle's towing receiver, the towing receiver is disabled for its intended purpose, namely towing. Thus, a cargo carrier that provides an auxiliary trailer hitch receiver for use even while cargo is being carried is desired.

SUMMARY OF THE INVENTION

The present invention is a cantilever displacement cargo carrier with an adjustable bearing slide. It has a beam with a first end and a second end, where the first end comprises a cantilever displacement housing with a pivot hole. The carrier has a pivot beam with a first end having a pivot bushing and a slide compartment where an upper adjustable bearing slide is in contact with a lower adjustable bearing slide. The upper adjustable bearing slide has two pin saddles and the lower adjustable bearing slide has a threaded adjusting bolt receiver. A horizontal bearing pin with a plurality of roller bearings is inserted into the two pin saddles. An adjusting bolt is inserted into the threaded adjusting bolt receiver. A pivot pin is inserted into the pivot hole and the pivot bushing.

BRIEF DESCRIPTION OF THE DRAWINGS

The objects and features of the present invention, which are believed to be novel, are set forthwith particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a cantilever displacement cargo carrier.

FIGS. 1 through 7 illustrate a preferred embodiment of a swing away cargo carrier 100. The carrier can comprise a variety of materials including metals such as aluminum or steel and carbon fiber. The selection of materials depends upon the size, shape and weight of cargo items intended to be transported by the system. Preferably, bearings, rollers and pins comprise high carbon steel often used in tooling. Preferred lubricant is a standard grease lubricant used in the automotive industry.

Figure 1:
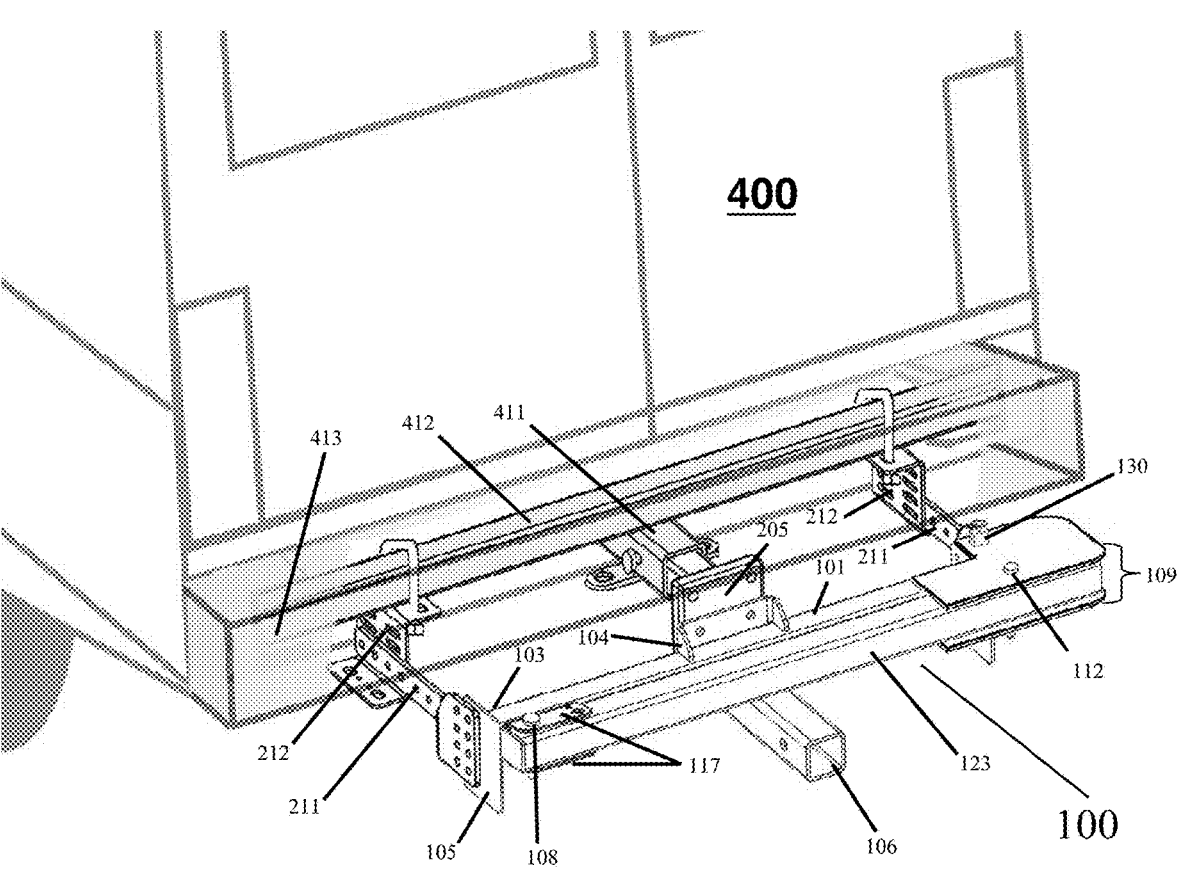
FIG. 01 is a perspective view showing a preferred embodiment of the cargo carrier in the closed configuration mounted to the trailer hitch receiver of a vehicle.

Referring now to FIG. 1, a preferred embodiment of a cargo carrier mounted to a vehicle 400 at a trailer hitch receiver 411 is shown. The cargo carrier preferably has an adjustable adaptor mount 205 and two supporting tethering arms 211 that are attached to the vehicle 400. The adjustable adaptor mount 205 is preferably mounted to the vehicle 400 at the trailer hitch 411 and the adjustable tethering arm mounts 211 are mounted to the vehicle 400 at tethering arms 212. The invention 100 preferably has a fixed beam 101 with a parallel orientation to the rear of the vehicle 400 and a pivot beam 123 attached to an end of the fixed beam 101. Preferably, the cargo carrier has a trailer hitch receiver 106 that is attached to the fixed beam 101.

Figure 2:
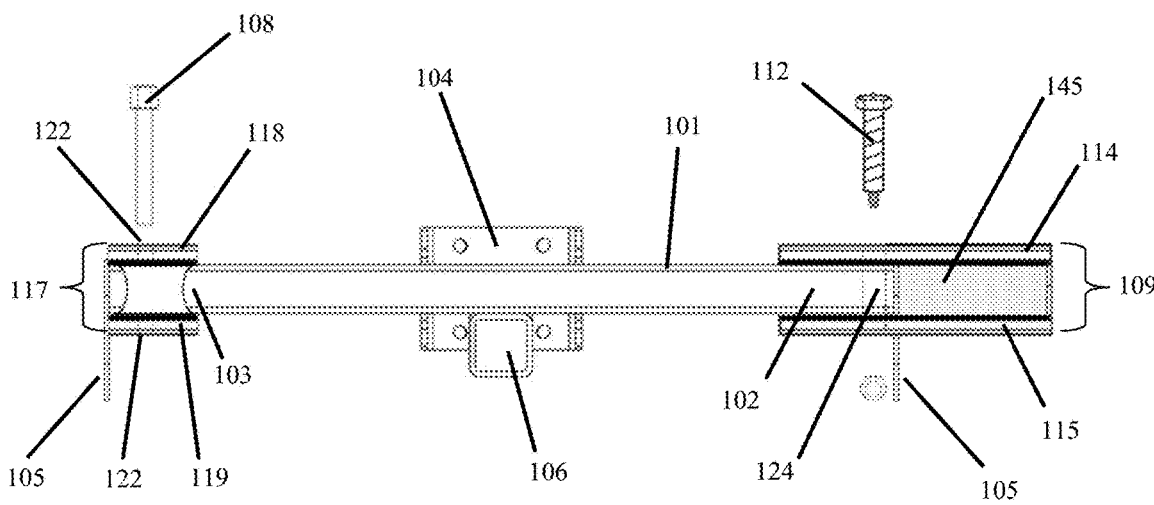
FIG. 02 is a front view showing a preferred embodiment of the face of the cargo carrier frame body with the pivoting beam removed.
Figure 3:
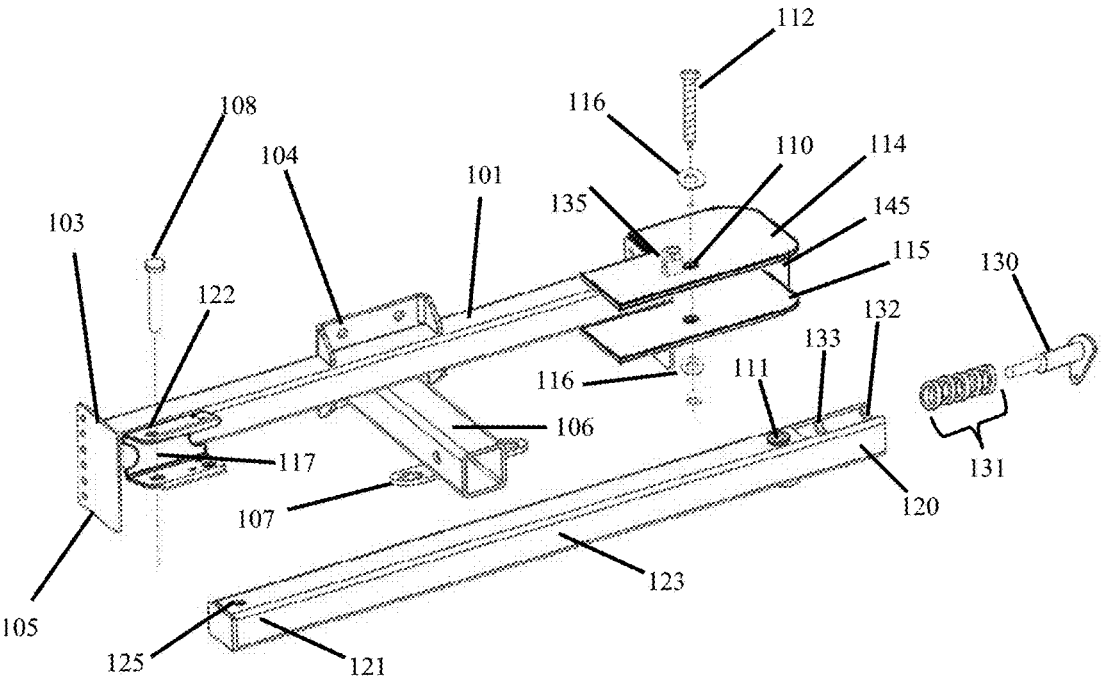
FIG. 03 is a perspective exploded view showing the cargo carrier with the pivot beam separate from the fixed beam.

Referring now to FIG. 2, the preferred embodiment has a fixed beam 101. The fixed beam 101 has a first end 102 and a second end 103. The first end 102 preferably has a cantilever displacement housing 109 comprising an upper flange 114 and lower flange 115. The flanges 114 and 115 are preferably joined together to the fixed beam 101 and connected to vertical end cap 145 and create a receiving receptacle 109 for the pivot beam 123 (as shown in FIG. 3). The second end 103 preferably has a self aligning receiving saddle 117 resembling a C-channel apparatus with an upper jaw 118 and a lower jaw 119; where each jaw 118, 119 preferably has a surface with an outwardly rounded extended slanted lip at its outer end to create a clamming lip guide. This may also be a curved lip or similar structure to create a cam that guides the pivot beam 123 into the receiving saddle 117.

Referring now to FIG. 3, a preferred embodiment of the invention is shown with the pivot beam 123 detached from the fixed beam 101. Please note, the pivot beam 123 can also be described and/or referred to as a swinging arm, rotating beam or pivot arm. The pivot beam 123 has a first end 120 with a pivot bushing 111 (the pivot bushing 111 preferably further comprises a pivot bearing sleeve 124) that preferably aligns with through holes 110 in the upper flange 114 and lower flange 115 and a set of pin saddles 133/132 that support one or more (five shown) roller bearings 131 that are supported by a horizontal bearing pin 130 that is attached to the end of the pivot beam 123. The roller bearings 131 preferably contact, and roll on, upper flange 114 to reduce pressure on the pivot pin 112 and pivot bearing 124. The pivot pin 112 preferably has a shoulder bolt stop and is grooved for easier lubrication. The bearing pin 130 for this configuration is preferably 1" in diameter with a length of 5". The bearing pin 130 further preferably has a 3.5" shoulder where 0.5" wide roller bearings 131 can rotate.

Figures 19, 20, 21, 22, 23, 24, 25, 26:
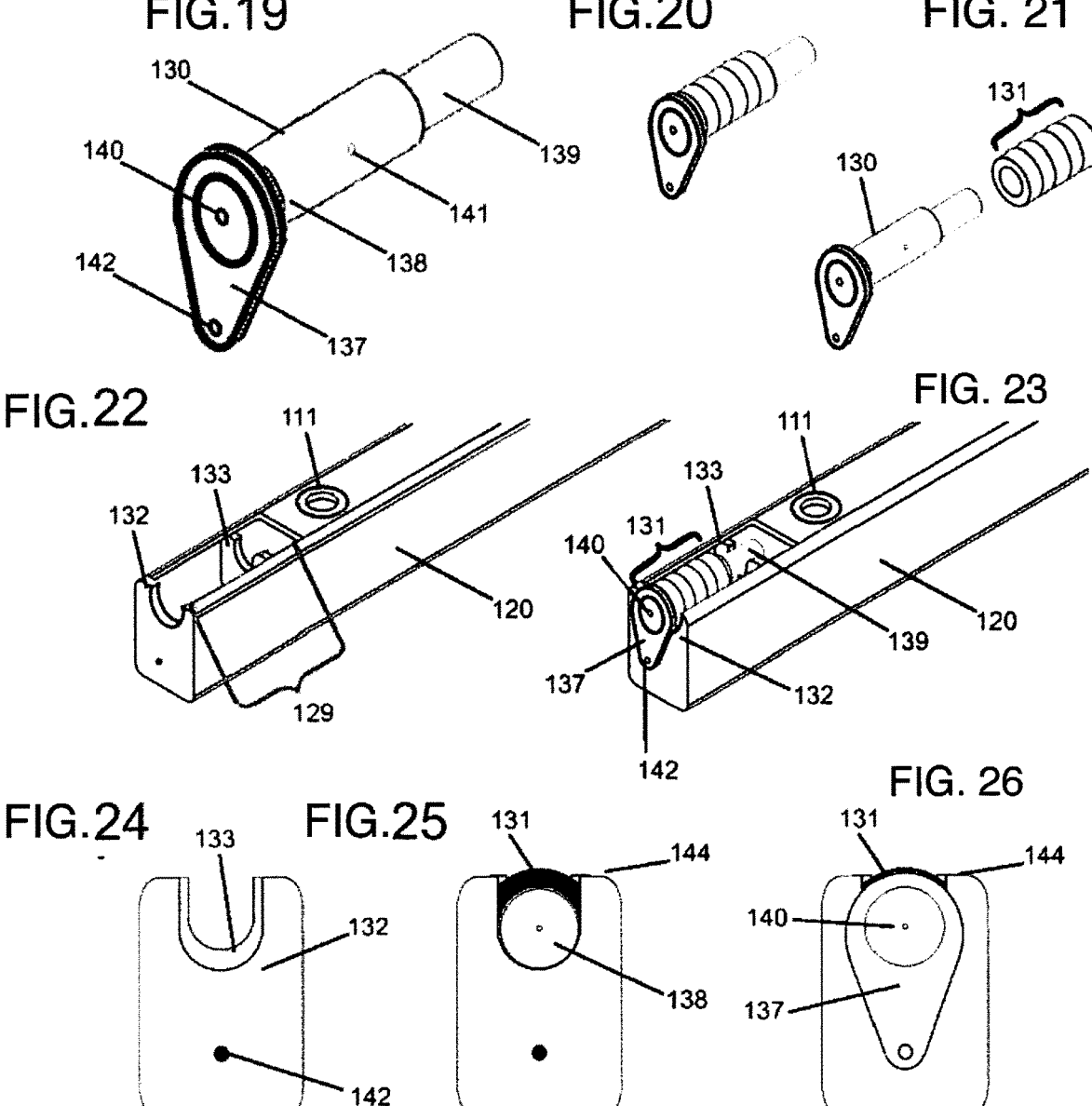
FIG. 19 is a perspective view of a preferred embodiment of the horizontal bearing pin.
FIG. 20 is a perspective view of a preferred embodiment of the horizontal bearing pin with roller bearings installed.
FIG. 21 is an exploded perspective view of a preferred embodiment of the horizontal bearing pin with roller bearings.
FIG. 22 is a perspective view of a preferred embodiment of the first end of the pivot beam.
FIG. 23 is a perspective view of a preferred embodiment of the first end of the pivot beam with the horizontal bearing pin and roller bearings installed.
FIG. 24 is an end view of a preferred embodiment of the first end of the pivot beam.
FIG. 25 is an end view of a preferred embodiment of the first end of the pivot beam with the horizontal bearing pin (mounting flange not shown) and roller bearing installed.
FIG. 26 is an end view of a preferred embodiment of the first end of the pivot beam with the horizontal bearing pin and roller bearing installed with the mounting flange visible.

FIGS. 19 through 26 show the bearing pin and roller bearings in detail. Referring now to FIG. 19, a preferred embodiment of the bearing pin 130 is shown. Preferably, the bearing pin 130 is a rounded metal pin with a mounting flange 137 on a first end 138 and a reduced shank on a second end 139. The bearing pin 130 preferably has an opening 140 for a grease fitting where lubricant can be delivered to the surface of the bearing pin 130 through a channel (not shown) and out a lubrication port 141. The mounting flange 137 preferably has a mounting hole 142 that can be used to mount the bearing pin 130.

Referring now to FIGS. 20 and 21, a preferred embodiment of the roller, or sleeve, bearings 131 are shown with the bearing pin 130. Five sleeve bearings 131 are shown in FIGS. 20 and 21. The sleeve bearings 131 are preferably placed onto the bearing pin 130. While five sleeve bearings 131 are shown in FIGS. 20 and 21, the invention can use a single sleeve/roller bearing 131 or a plurality of roller bearings as shown in FIGS. 20 and 21. The width, thickness and number of bearings 131 used depend on, inter alia, the length of the cantilever portion of the pivot beam 123, the weight of the cargo to be carried, and the rotation desired.

Referring now to FIG. 22, a preferred embodiment of the first end 120 of the pivot beam 123 is shown. The first end 120 preferably has a pivot hole 111 and channel cutout 129 with the pin saddle inner 133 and pin saddle outer 132. The channel cutout 129 is dimensioned to receive the horizontal bearing pin 130 and bearing(s) 131.

Referring now to FIG. 23, the preferred embodiment of the bearing pin 130 and bearings 131 are inserted into the pin saddles 132/133 in the channel cutout 129. FIG. 23 shows the bearing pin 130 with the bearings 131 installed into the pin saddle inner 133 and pin saddle outer 132. Preferably, the bearing pin 130 is then secured in place with a fastener/bolt place through the mounting hole 142 in the mounting flange 137.

Referring now to FIG. 24, an end view of a preferred embodiment of the first end 120 of the pivot beam 123 is shown. The inner saddle 133 and outer saddle 132 are shown, as is the mounting hole 142.

Referring now to FIG. 25, an end view of a preferred embodiment of the first end 120 of the pivot beam 123 is shown. FIG. 25 further shows the bearing pin 130 and the sleeve bearing 131 installed with mounting flange 137 removed for visibility. The outer circumference of the sleeve bearing 131 is preferably elevated above the top surface 144 of the pivot beam 123. This allows the bearing(s) 131 to contact (and roll on) the upper flange housing 114 of the fixed beam 101. The bearing sleeve(s) 131 can comprise different thicknesses to provide for a change in elevation of the bearing 131 above the top surface 144 of the pivot beam 120 for, inter alia, adjustability.

Referring now to FIG. 26, an end view of a preferred embodiment of the first end 120 of the pivot beam 123 is shown with bearing pin 130 and at least one sleeve bearing 131 installed. The bearing sleeve 131 is shown elevated above the top surface 144 of the pivot beam 123. Preferably, a grease fitting can be inserted at the lubrication port 140 so to provide lubrication to the sleeve bearings 131.

Referring back to FIG. 3, the second end 121 of the pivot beam 123 preferably has an anchor bushing 125 that aligns with the through holes 122 in the self-aligning receiving saddle 117. The ratio of length of the first end 120 (roughly the length from pivot hole 111 to the end of the horizontal bearing 130) to the total length of the pivot beam 123 depends on the weight of cargo to be carried. However, for a pivot beam of 30" to 42" in total length, a first end 120 length of 6" is preferred.

Figure 4:
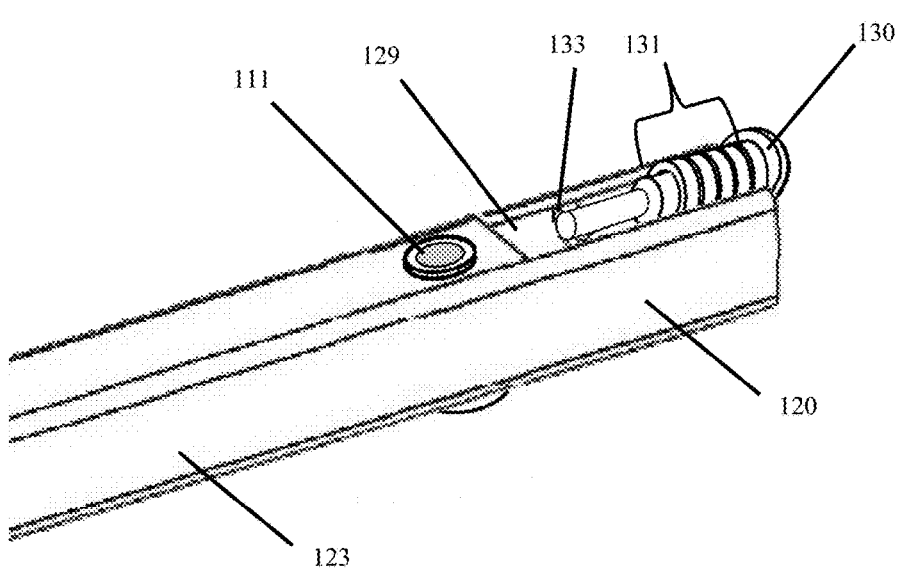
FIG. 04 is a close up sectional view of a preferred embodiment of the first end of the pivot beam.
Figure 5:
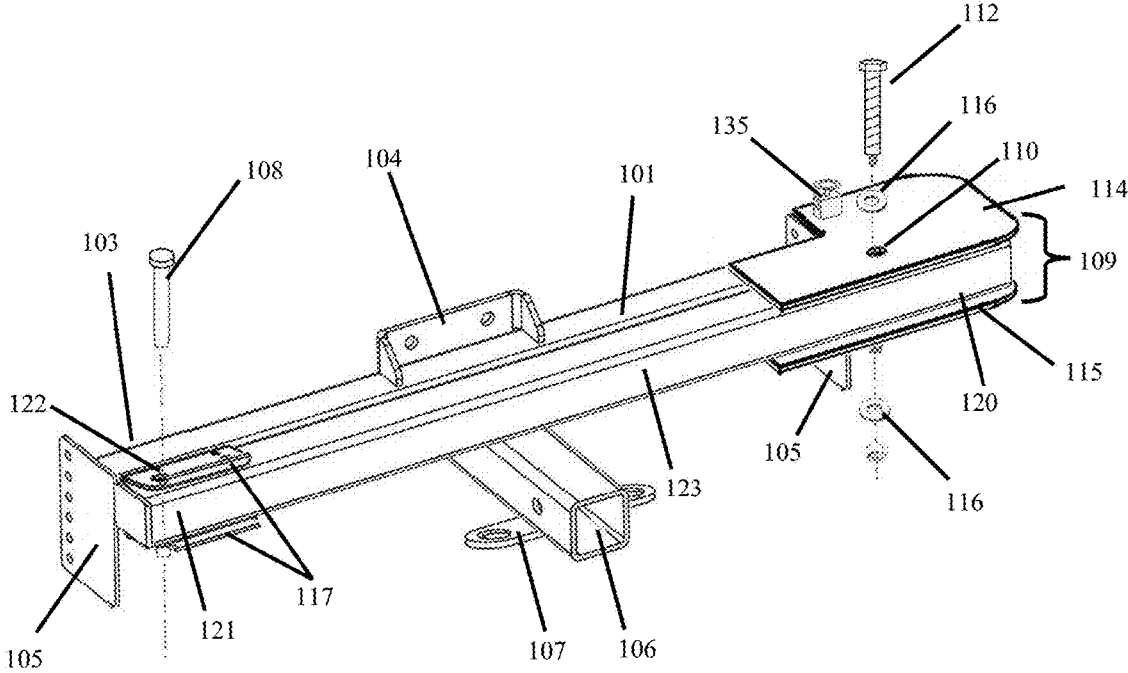
FIG. 05 is a front view showing a preferred embodiment of the invention in a closed configuration.

Referring now to FIG. 4, a close up sectional view of the first end 120 of the pivot beam 123 is shown. The bearing pin 130 and bearings 131 are preferably installed onto the pin saddle inner 133 and the pin saddle outer 132. Referring now to FIG. 5, the first end 120 is preferably pivotally interconnected to the cantilever displacement housing 109 between the upper flange 114 and lower flange 115 by a pivot bearing sleeve 124, stop washers 116, and a pivot retaining pin or bolt 112. This allows the pivot beam 123 to rotate horizontally between the upper flange 114 and lower flange 115 of the cantilever displacement housing 109 and resist vertical movement by an internal shear point for forces to balance. This structure ensures that compression is equal to load. The housing 109 is preferably fabricated from heavy plate stock. The receiving saddle 117 is configured to respectively retain and secure the second end 121 of the pivot beam 123 in the closed position with retaining pin 108.

Figure 6:
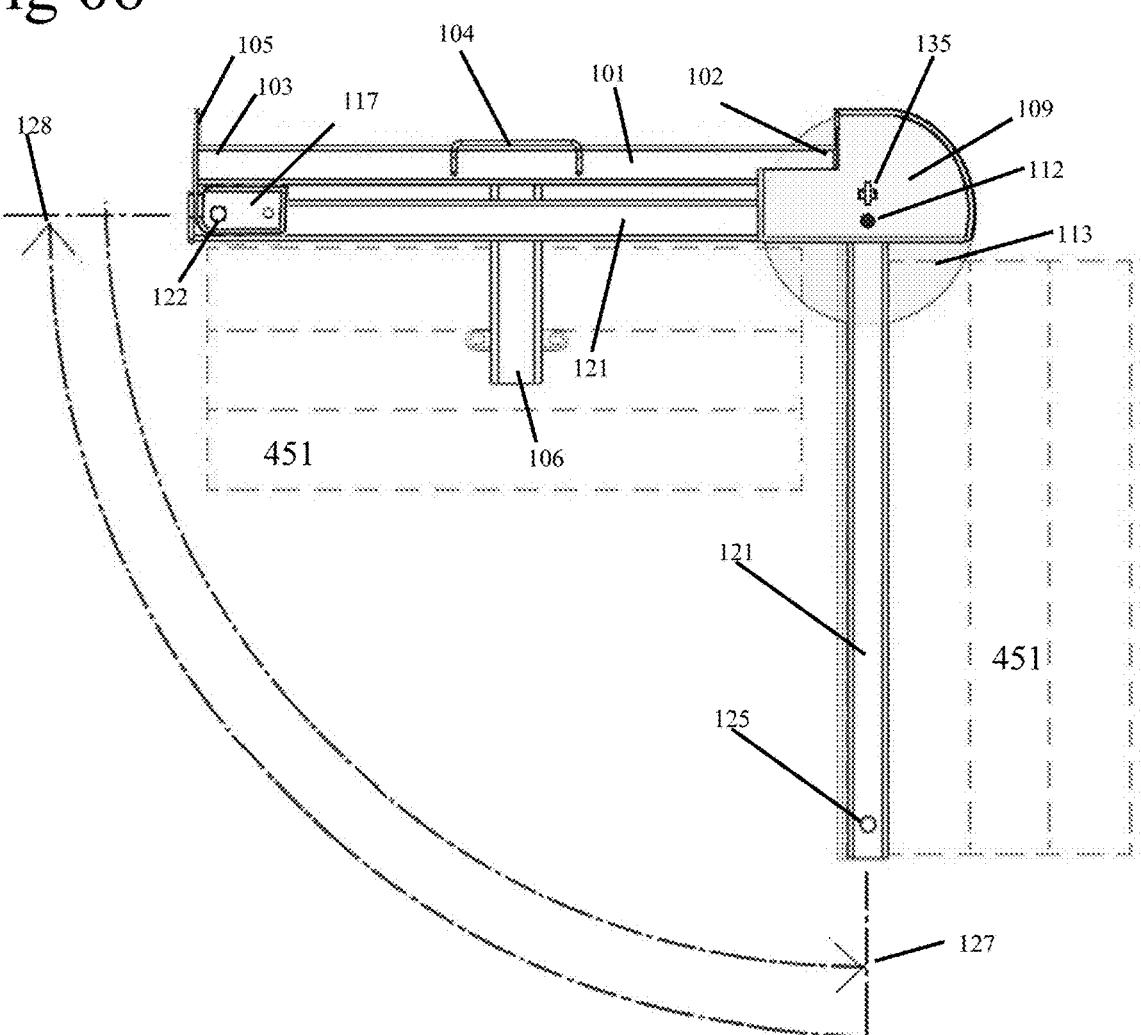
FIG. 06 is a top view diagram of the preferred movement range of a preferred embodiment of the invention.

Referring now to FIG. 6, a diagram of the preferred movement range of the invention is shown. The pivot beam

123 preferably provides a place to mount an otherwise fixed non-pivoting accessory 451 so the accessory can pivot between an open position 127 and a closed position 128. The pivot beam 123 is supported at the first end 102 of the fixed beam 101 by the cantilever displacement housing 109. The pivot beam pivoting axis location 111 is preferably placed inward from first end 120 on the pivot beam 123 as shown in FIGS. 3 and 4 to create an offset of a predetermined length, namely radius 113 (shown in FIG. 6). The length of radius 113 is determined by the desired cantilever weight. The pivoting axis 111 is then aligned with the through holes 110 and secured in the cantilever displacement housing 109 with the pivot retaining bolt 112. Pivot retaining bolt 112 can be a bolt and nut or a pin or other pivot structure. To place the beam 123 in the closed or travel position 128, the pivot beam 123 is retracted or rotated inward until the pivot beam 123 is inserted into, and supported by, the self-aligning receiving saddle 117. The saddle 117 may be attached by weldment to the fixed beam 101 and secured in place to beam 123 by a retaining pin 108.

Figure 7:
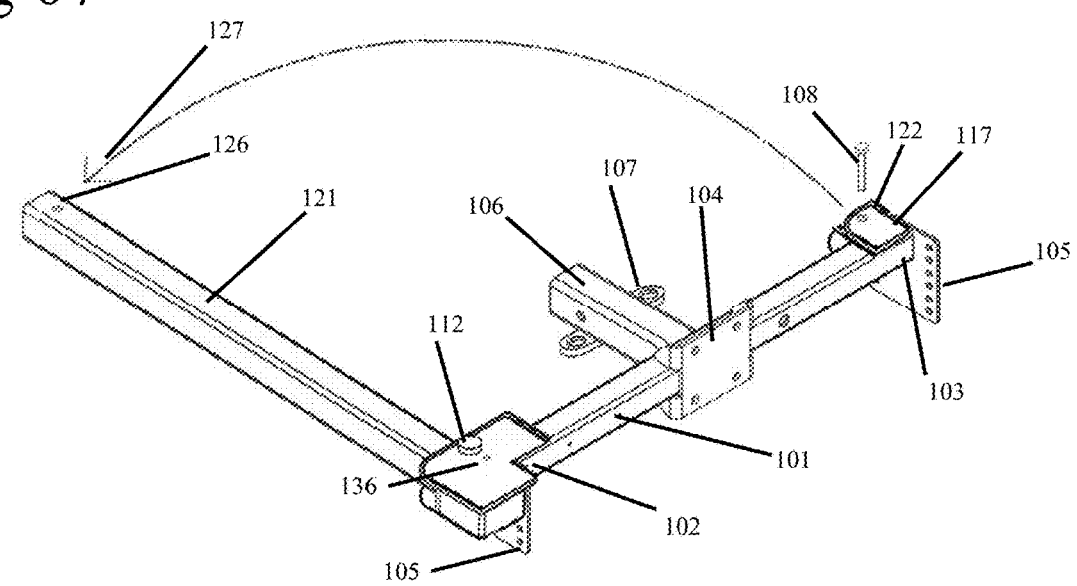
FIG. 07 is a rear perspective view of a preferred embodiment of the cargo carrier 100 in the open position 127.

Referring now to FIG. 7, a rear view of a preferred embodiment of the cargo carrier 100 in the open and locked position 127 is shown. The lock system (also shown in FIG. 6) preferably includes a spring-biased plunger 135 (or pin) that is configured to retain and secure the pivot beam 123 in the cantilever displacement housing 109 by entering an opening 136 in the flange housing upper 114 and aligning with channel cutout 129 shown in FIG. 4 in the pivot beam 123. The lock system is preferably used to lock the pivot beam 123 in the open position, e.g. when used on an incline.

Figure 8:
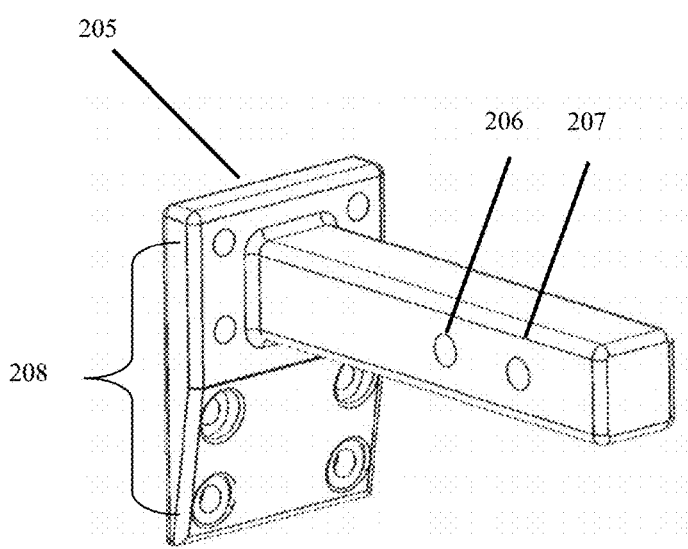
FIG. 08 is a front perspective view of a preferred embodiment of the universal adjustable mount.

Referring now to FIG. 8, a preferred embodiment of a universal adjustable mount 205 with a set of horizontal mounting holes 206 and 207 is shown. The holes 206, 207 provide horizontal adjustability for the vehicle towing receiver 411. Vertical mounting holes 208 provide vertical adjustability for the frame body center mounting plate 104.

Figure 9:
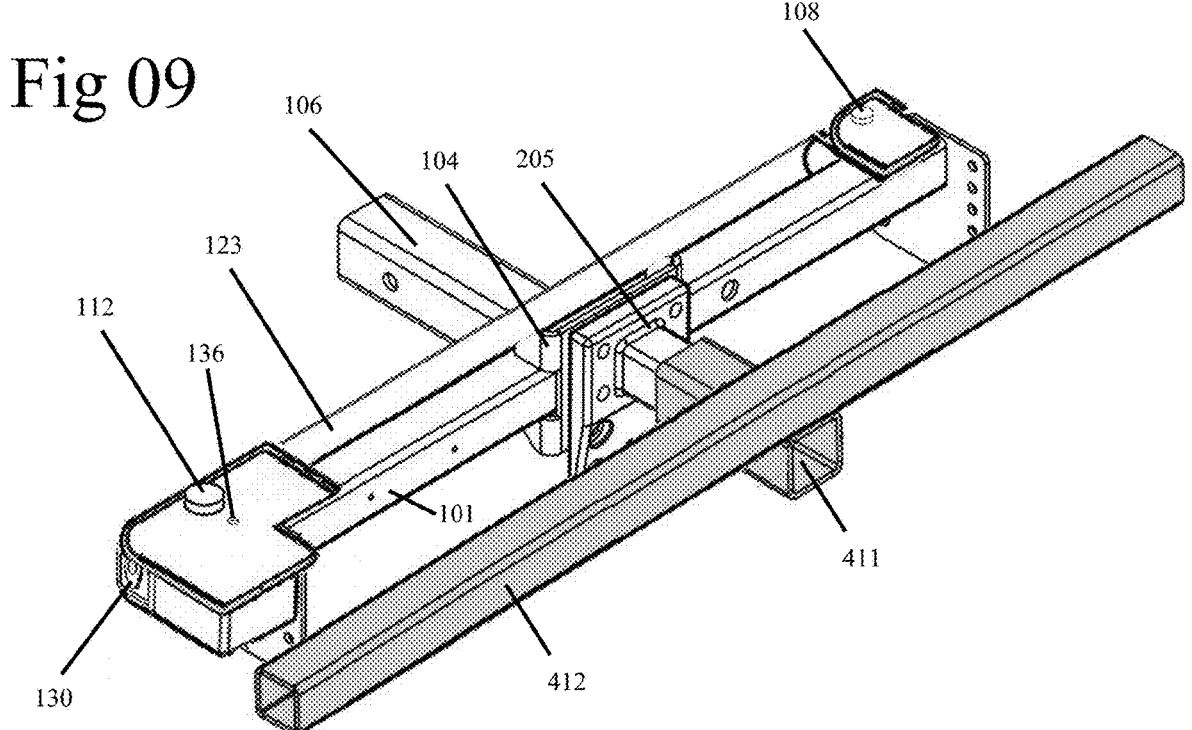
FIG. 09 is a rear perspective view of a preferred embodiment of the cargo carrier installed to a vehicle towing receiver with the adjustable receiver mount and tethering arms and mounts.

Referring now to FIG. 9, a preferred embodiment of the invention for a vehicle with a trailer hitch receiver 411 is shown. Preferably, the universal adjustable mount 205 is attached to the frame body center mounting plate 104 using the adjustable vertical mounting holes 208 to achieve the desired install height and then inserted in to the vehicle receiver 411 to the desired depth using the horizontal mounting holes 6 and 7. A pin and clip 209 (not shown) then preferably connect the cargo carrier 100 to the vehicle 400.

Figure 10:
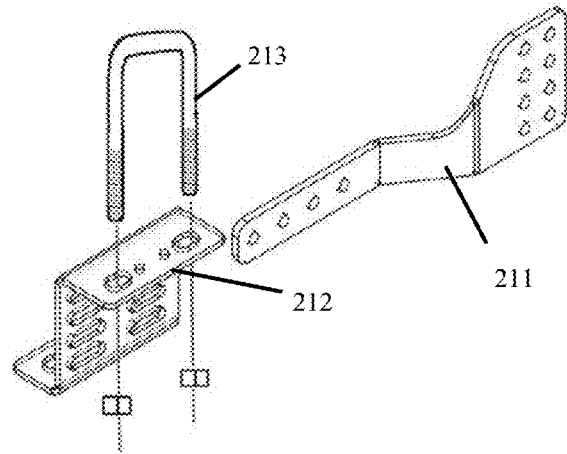
FIG. 10 is a side perspective view of a preferred embodiment tethering arm and mount.

Referring now to FIG. 10, a preferred embodiment tethering arm 211 and mount 212 is shown. This embodiment is preferably for vehicles that have a trailer hitch receiver 411 and are using the trailer hitch adaptor 205 and require additional carrying capacity, support and or stabilization at a second and third contact point at the tethering arms 211 and tethering mount 212 and U-bolt and hardware 213.

Figure 11:
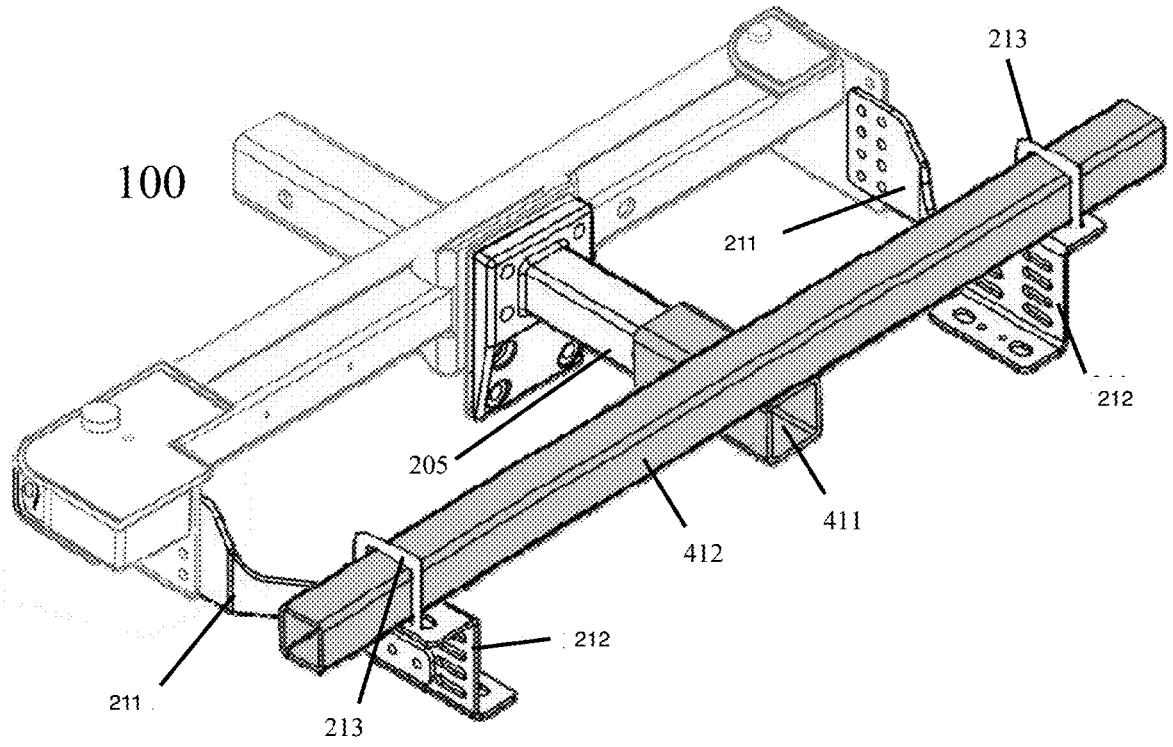
FIG. 11 is a rear perspective view of a preferred embodiment of an adjustable receiver mount and tethering arms and mounts mounted on a vehicle's trailer hitch receiver.

Referring now to FIG. 11, the tethering arms 211 are preferably mounted to the fixed beam 101 at side mounting plates 105 and then to the tethering arm mounts 212. The mounts 212 are then attached to the vehicle towing receiver cross tube 412 by U-bolts and hardware 213 for added capacity and additional stability.

Figure 12:
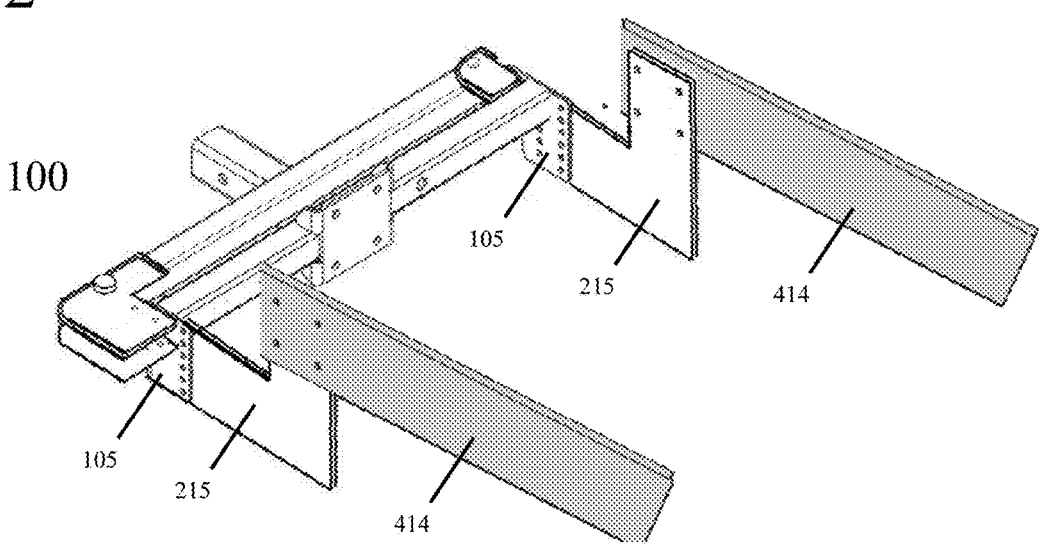
FIG. 12 is a perspective view of a preferred embodiment of a flat surface mount hitch plate on a vehicle with a preferred embodiment of the cargo carrier mounted thereon.
Figure 13:
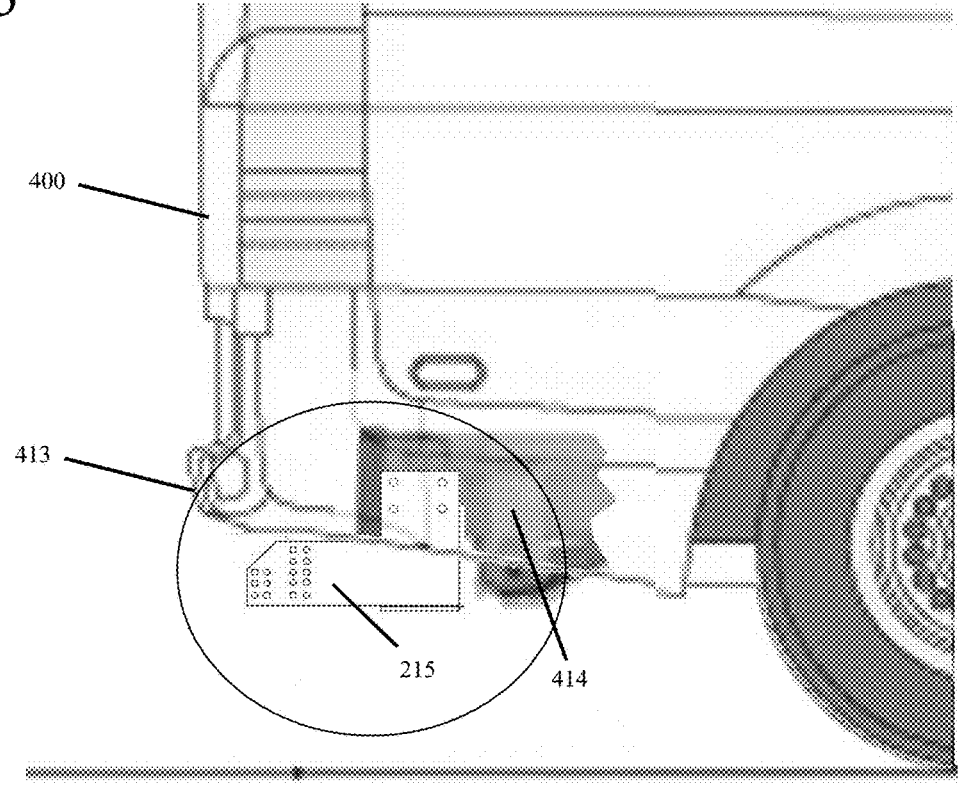
FIG. 13 is a side view of a preferred embodiment of a side mounting plate attached to a vehicle.

Referring now to FIGS. 12 and 13, a preferred embodiment of the invention for vehicles without a trailer hitch receiver 411 (as opposed to what is shown in FIG. 11) is shown. Preferably, the cargo carrier 100 is mounted directly to the vehicle 400 at frame 414 with two chassis frame mounting plates 215 where one plate 215 attaches to each side of the vehicle's frame 414. The plates 215 also attach to the fixed frame body end mounting plate 105.

Figure 14:
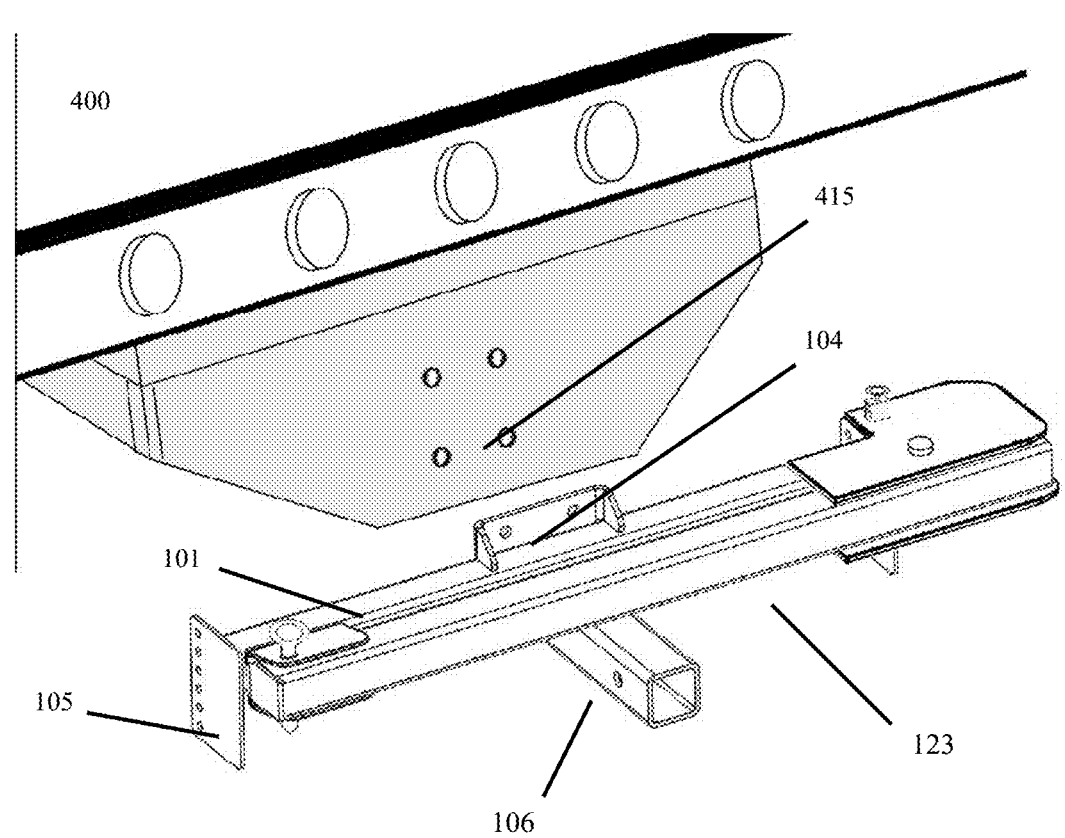
FIG. 14 is a front perspective view of a preferred embodiment of the invention detached from a vehicle hitch plate.

Referring now to FIG. 14, a preferred embodiment of the invention for vehicles that have a flat surface or hitch plate 415 (as with some vans, trucks and motor homes) is shown. The frame body center mounting plate 104 is connected directly to a flat surface hitch plate 415. Tethering arms 211 or fixed body end mounting plates 105 are preferably not used with this embodiment.

Figure 15:
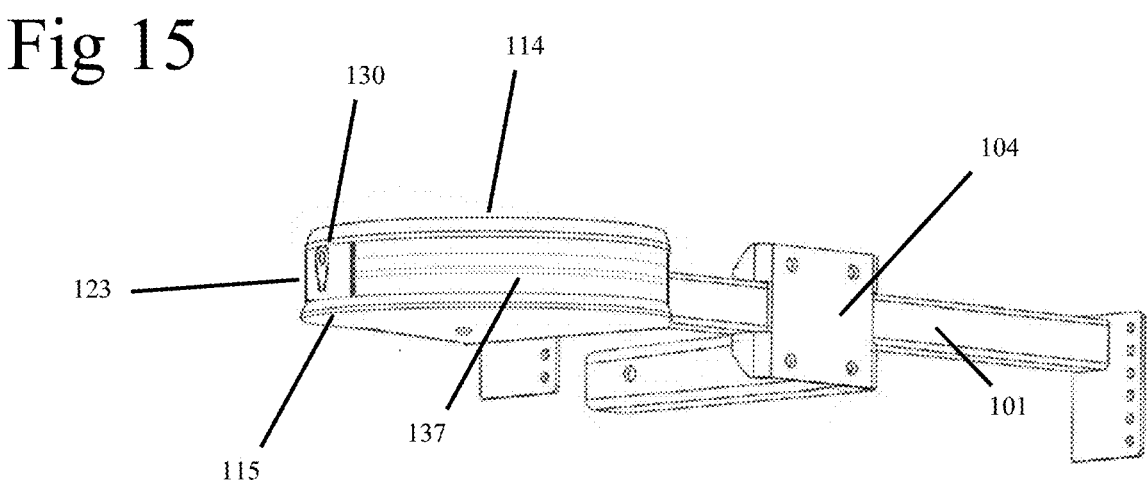
FIG. 15 is a rear perspective view of a preferred embodiment of the cargo carrier for attachment to a vehicle hitch plate.

Referring now to FIG. 15, a rear view of the preferred embodiment of the cargo carrier 100 in FIG. 14 is shown with the enclosed rear side of the cantilever displacement housing 109 and the frame body center mounting plate 104.

Figure 16:
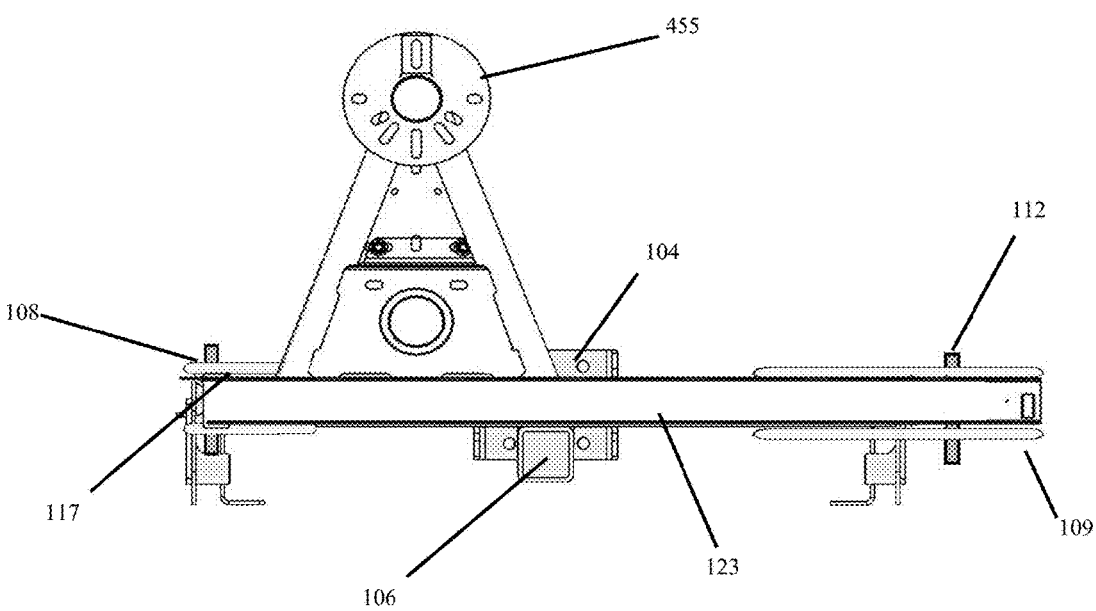
FIG. 16. is a front view of a preferred embodiment of the cargo carrier in the closed position with an optional tire carrier attached to the pivot arm.

Referring now to FIG. 16, a perspective front view of a preferred embodiment of the cargo carrier 100 with an otherwise fixed cargo apparatus is shown. In FIG. 16, a tire carrier 455 is shown mounted to the pivot beam 123 in the closed and stored position.

Figure 17:
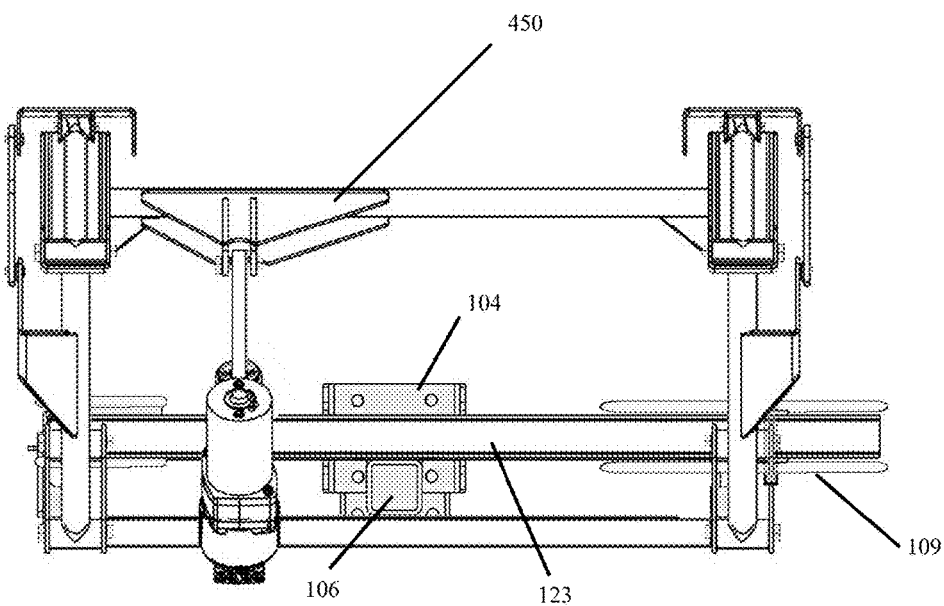
FIG. 17. is a front view of a preferred embodiment of the cargo carrier in the closed position with an optional power cargo carrier lift in the up position attached to the pivot arm.

The present invention combines effectively with the vehicle lift disclosed in U.S. patent application Ser. No. 14/999,844. Referring now to FIG. 17, a perspective front view of a preferred embodiment of the cargo carrier 100 with a hydraulic power lift/carrier 450 mounted to the pivot beam 123 in the closed and stored position is shown. The lift 450 is shown in the up position. The lift 450 is described in U.S. patent application Ser. No. 14/999,844 and is incorporated herein by reference.

Figure 18:
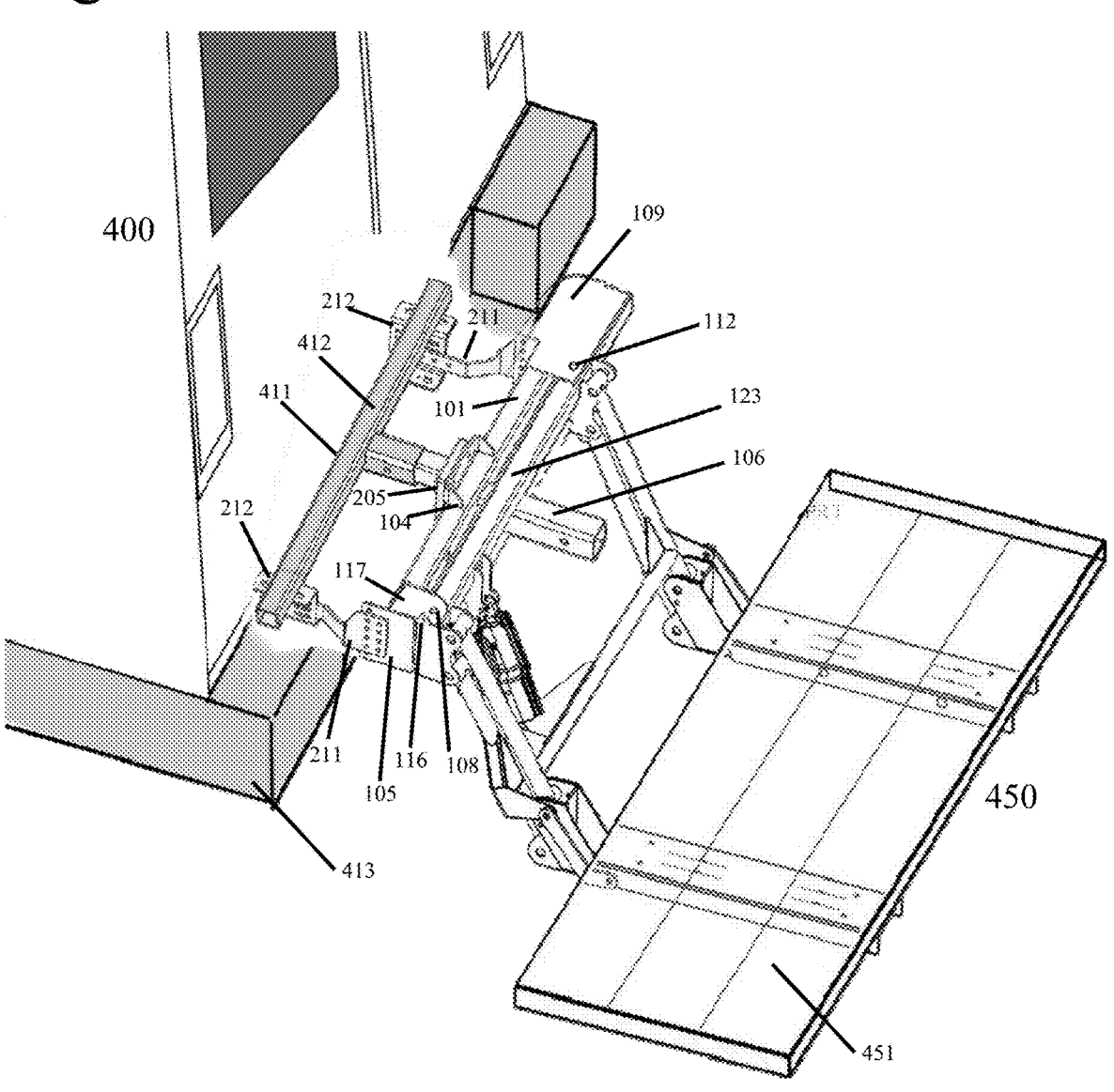
FIG. 18. is a perspective view of a preferred embodiment of the cargo carrier in the closed position mounted to a vehicle with an optional power cargo carrier lift in the down position attached to the pivot arm.
Figure 27:
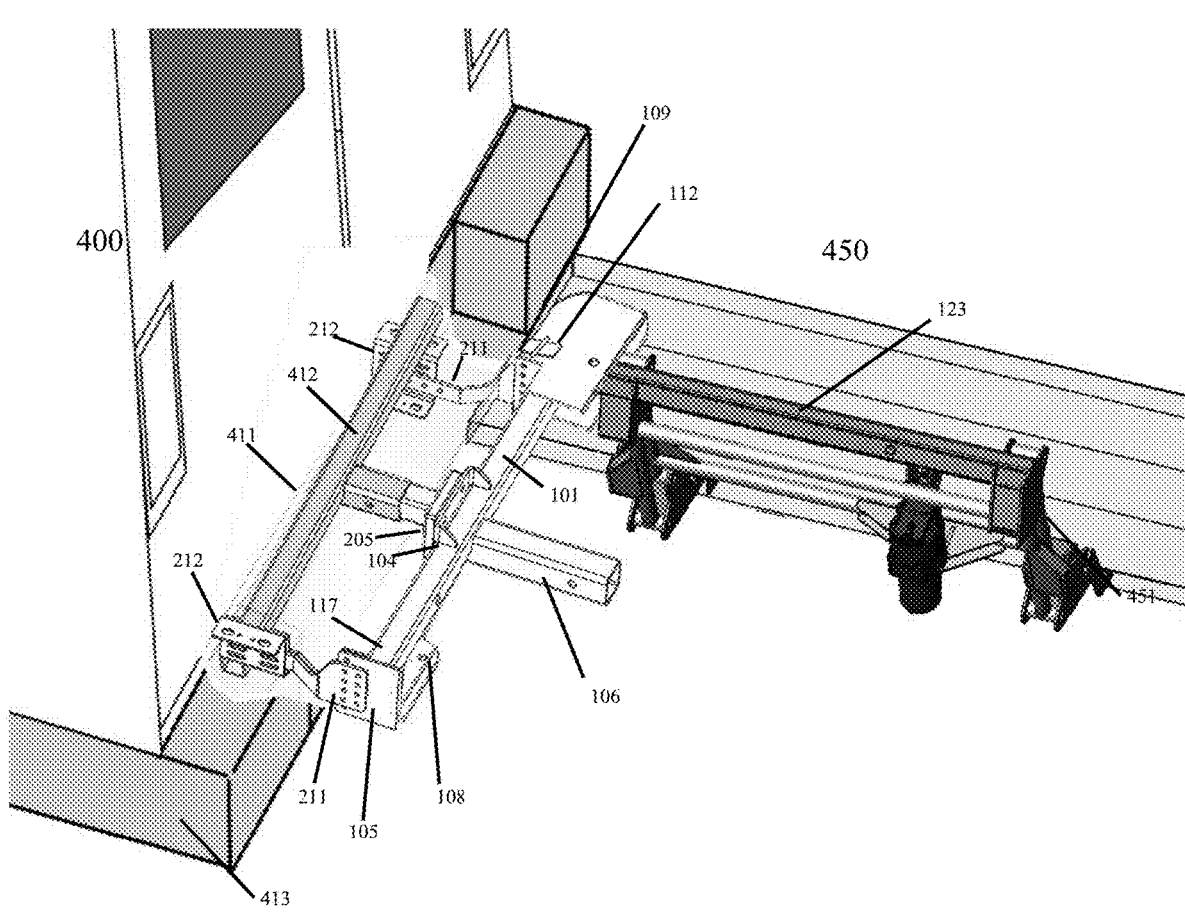
FIG. 27 is a perspective view of a preferred embodiment of the cargo carrier in the open position mounted to a vehicle with an optional power cargo carrier lift in the down position attached to the pivot arm.

Referring now to FIG. 18, a perspective view of a preferred embodiment of the cargo carrier 100 with the hydraulic power lift 450 is shown. The lift 450 is shown mounted to the pivot beam 123 where the beam 123 is in the closed and stored position. The hydraulic power lift 450 is shown in the down/loading position. FIG. 27 shows the preferred embodiment of the invention with the pivot arm 123 in the open position and the lift 450 in the "down" position.

Cantilever Displacement Cargo Carrier with Adjustable Bearing Slide

The invention described above uses a series of roller bearings that are supported by a bearing pin that is generally fixed in one position and not easily adjustable by external means. For example, if during assembly or due to wear the above device needs to be adjusted up or down, the first end 120 of the pivot beam 123 from the cantilever box 109 would preferably be removed and the bearings 131 on the bearing pin 130 replaced with larger or smaller diameter roller bearings as needed. The device would then be reassembled. The alternate embodiment described below (shown in FIGS. 28 to 35) can be externally adjusted, preferably with a wrench or socket, by turning an adjusting bolt 705 in or out to an optimal preload tension/end play by adjusting the roller bearing pin 130 and bearings 131 up or down. Accordingly, this embodiment allows easier adjustment of the bearing pin 130 up or down without having to disassemble the apparatus.

Figure 28:
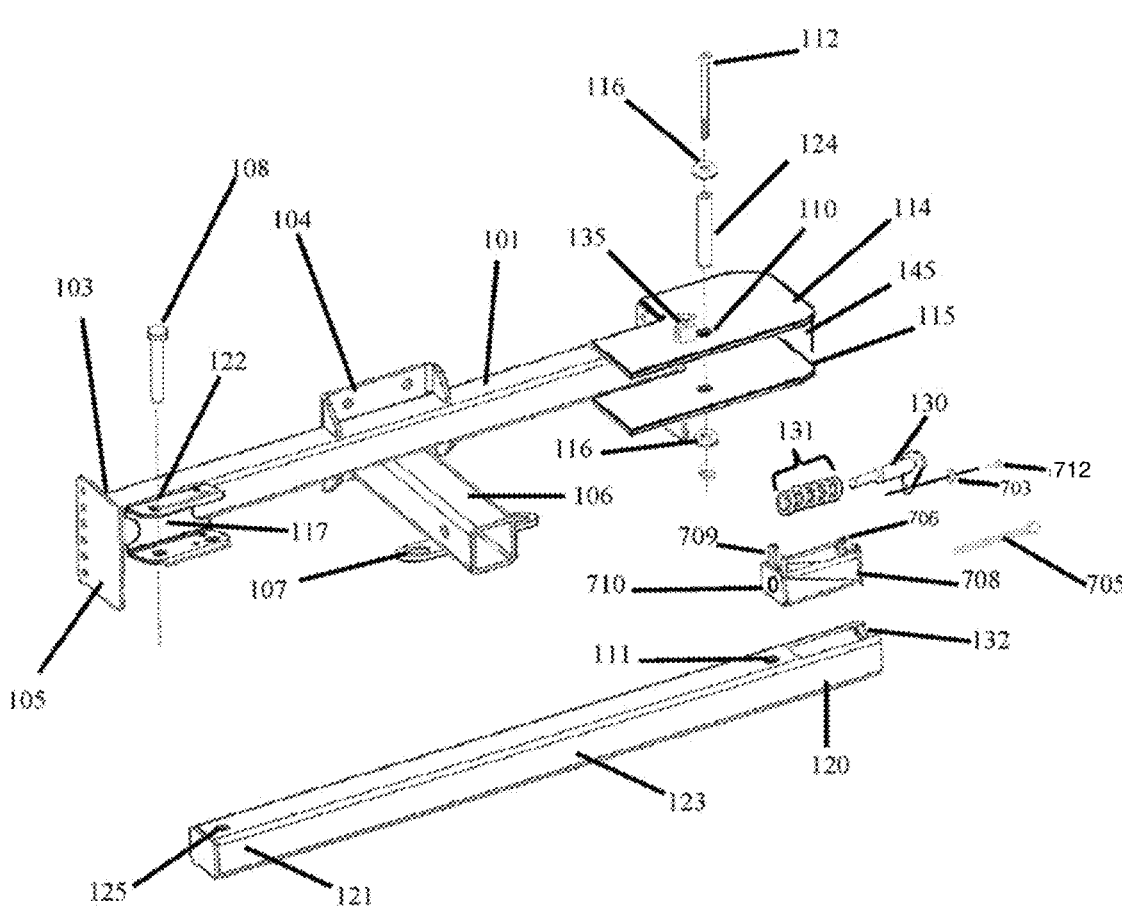
FIG. 28 is an exploded perspective view of an alternative preferred embodiment with an adjustable bearing slide.
Figure 29:
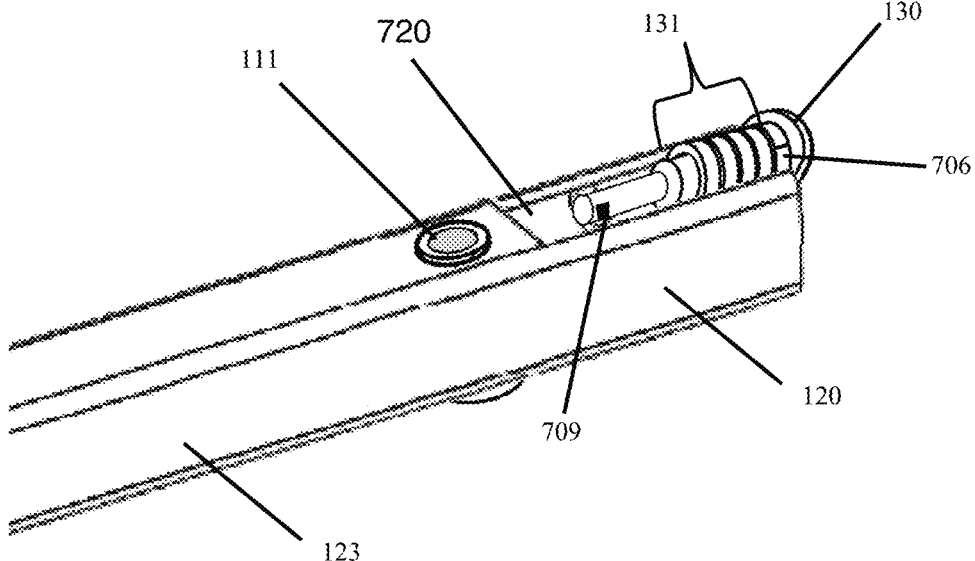
FIG. 29 is a perspective view of the alternative preferred embodiment with the adjustable bearing slide.

Referring now to FIG. 28, an exploded view of an alternate embodiment is shown preferably comprising an adjustable bearing pin mechanism instead of the fixed bearing assembly embodiment described above. The adjustable bearing mechanism is an assembly of a preload-adjustable roller bearing unit having an upper adjustable bearing slide 708 and a lower adjustable bearing slide 710. The upper adjustable bearing slide preferably has pin saddles 706 and 709 that support roller bearings 131 on a horizontal bearing pin 130. A portion of the assembled alternative embodiment is shown in FIG. 29.

Figure 30:
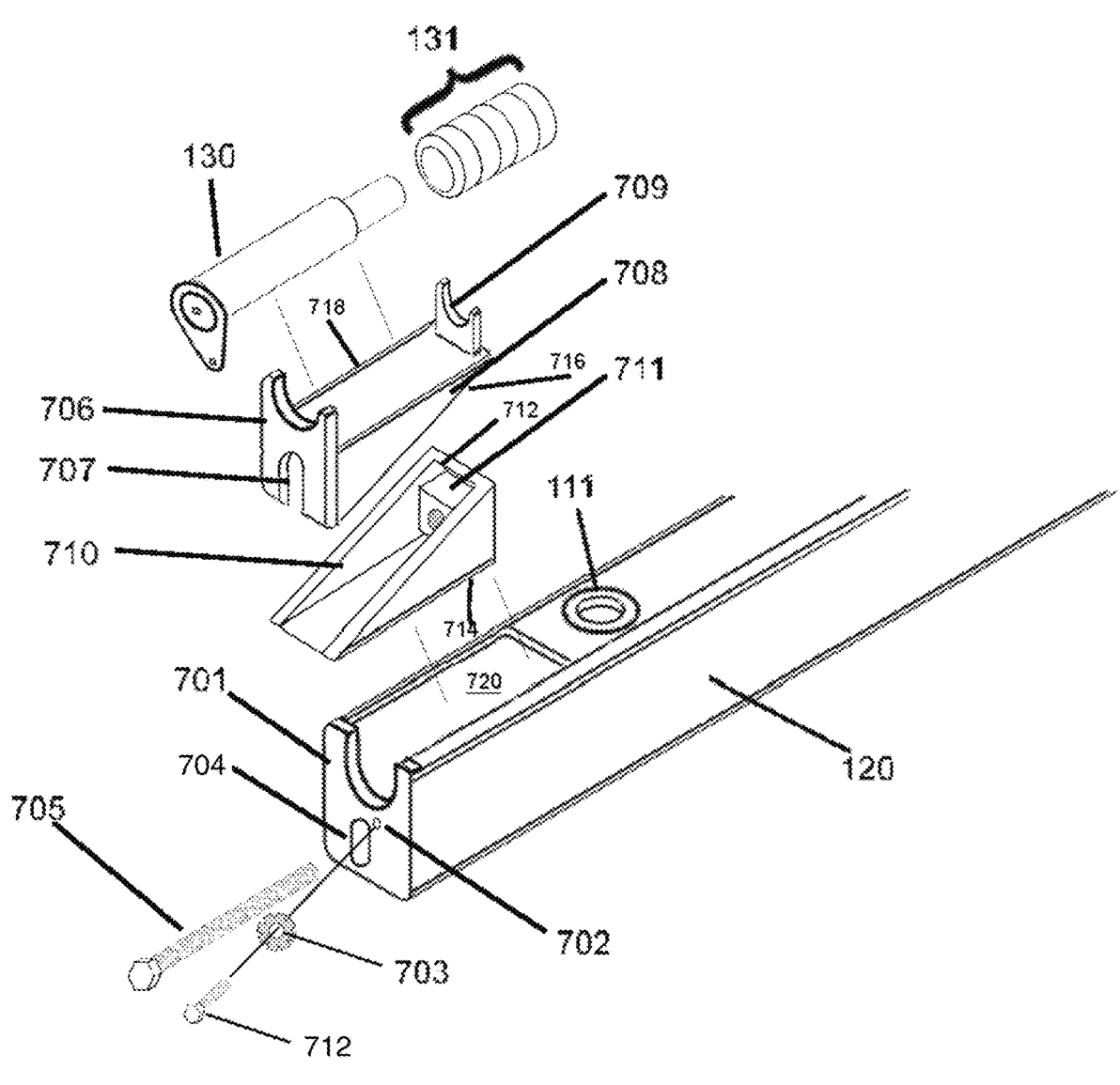
FIG. 30 is an exploded perspective view of the first end of the pivot beam with the adjustable bearing slide.
Figure 33:
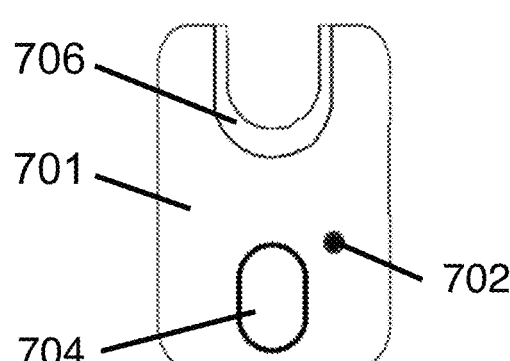
FIG. 33 is an end view of the preferred alternate embodiment first end of the pivot beam with the pin saddle visible.
Figure 34:
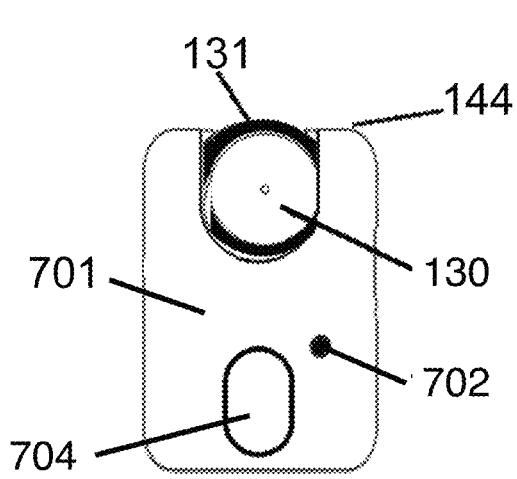
FIG. 34 is an end view of the preferred alternate embodiment first end of the pivot beam with the roller bearing pin and roller bearings visible, where the bearings are above the surface of the pivot beam; and, FIG. 35 is an end view of the preferred alternate embodiment first end of the pivot beam with the roller bearing pin with mounting flange, adjusting bolt and bearing pin nut visible.
Figure 35:
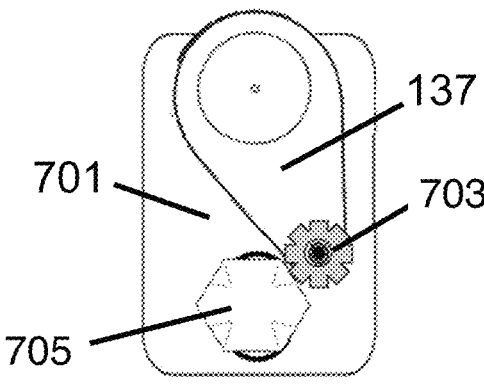

Referring now to FIG. 30, an exploded view of the preferred alternate embodiment adjustable bearing pin mechanism is shown. The lower adjustable bearing slide 710 preferably has a sloped top surface 712 and a flat bottom surface 714 and a threaded adjusting bolt receiver 711. The upper adjustable bearing slide 708 preferably has a sloped bottom surface 716 that contacts and opposes the sloped top surface 712 of the lower adjustable bearing slide 710. The upper adjustable bearing slide also preferably has a second adjusting bolt slot 707 and a flat top surface 718 with pin saddles 706 and 709. The roller bearing pin 130 is preferably supported by the pin saddles 706/709 and supports the roller bearings 131. The assembly described preferably fits in the first end 120 of the pivot beam 123 in slide compartment 720. The alternative embodiment of the first end 120 preferably comprises a pivot beam end 701 with a first adjusting bolt slot 704 and a bearing pin lock 702, preferably threaded for a bearing pin bolt 712 and a bearing pin lock tab washer 703. An adjusting bolt 705 preferably inserts through the first adjusting bolt slot 704 and the second adjusting bolt slot 707 into the threaded adjusting bolt receiver 711. Referring to FIG. 35, the bearing pin lock tab washer 703 preferably holds the roller bearing pin 130 in place at the bearing pin lock 702 via the mounting flange 137. This preferably allows the roller bearing pin 130 to move up and down with the pin saddles 706 and 709 while remaining attached to the swing arm end 701. FIG. 33 is an end view of the preferred alternate embodiment first end 120 of the pivot beam 123 with the pin saddle 706 visible. FIG. 34 is an end view of the preferred alternate embodiment first end 120 of the pivot beam 123 with the roller bearing pin 130 and roller bearings 131 visible, where the bearings 131 are above the surface 144 of the pivot beam 123.

Figure 31:
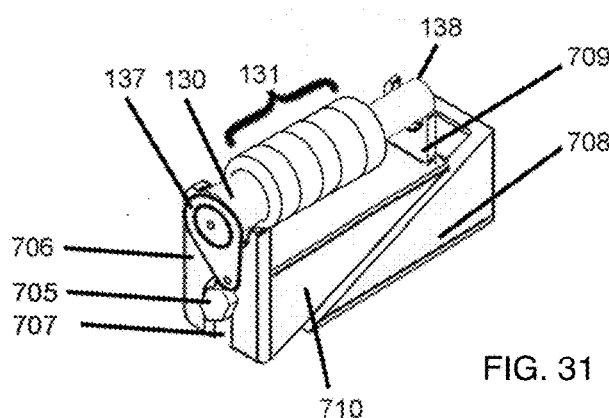
FIG. 31 is a perspective view of the adjustable bearing slide assembly.
Figure 32A:
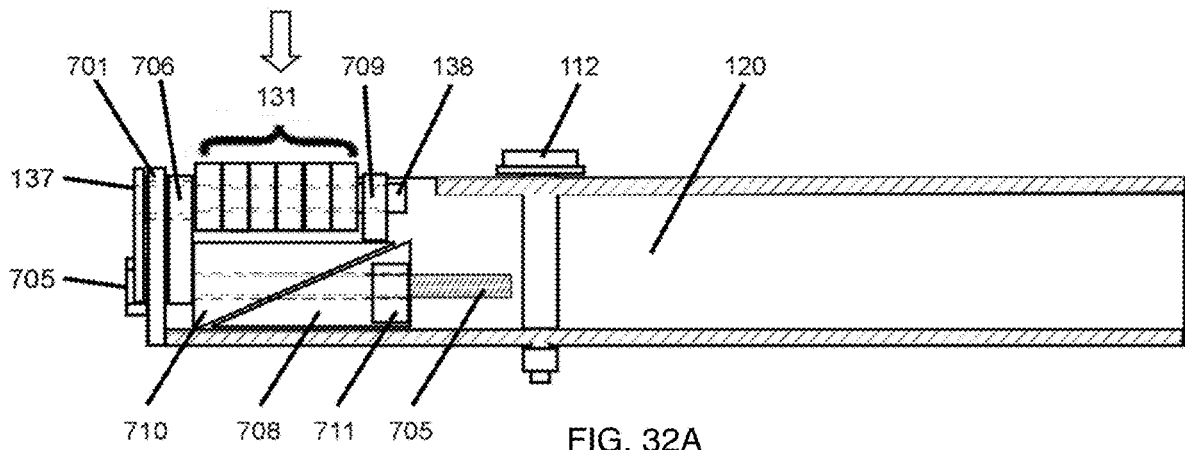
FIG. 32A is a side cross-sectional view of the preferred embodiment of the first end of the pivot beam with the adjustable bearing slide in a lowered position.
Figure 32B:
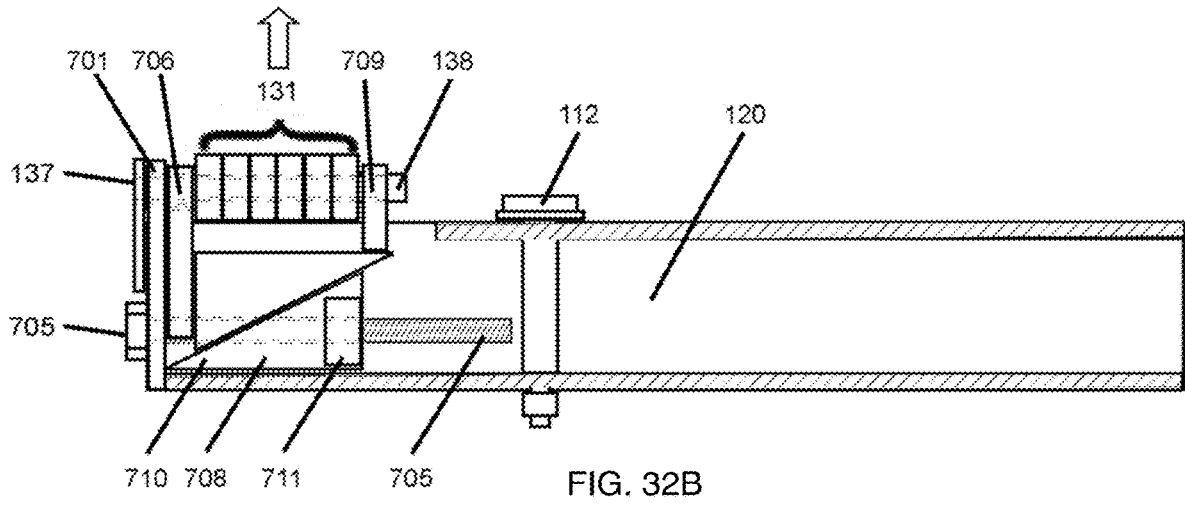
FIG. 32B is a side cross-sectional view of the preferred embodiment of the first end of the pivot beam with the adjustable bearing slide in a raised position.

Referring now to FIG. 31, a perspective view of the preferred embodiment of the assembled adjustable bearing pin mechanism is shown. By turning the adjusting bolt 705 into or out of the threaded adjusting bolt receiver 711 (not shown in FIG. 31), the lower adjustable bearing slide 710 is pulled toward or away from the swing arm end 701. Accordingly. as the lower adjustable bearing slide 710 moves toward or away from the pivot beam end 701, the upper adjustable bearing slide 708 moves up or down the sloped top surface 712 of the lower adjustable bearing slide 710 via the sloped bottom surface 716. FIG. 32A is a side view showing the preferred embodiment of the assembly in a lowered position. FIG. 32B is a side view showing the preferred embodiment of the assembly in a raised position. Thus, the surface of the roller bearings 131 are raised and lowered by externally adjusting the adjusting bolt 705 and without removing the assembly from the pivot beam 123.

Thus, a cargo carrier is described above where the roller bearings can be adjusted up or down more easily without disassembling the device. In each of the above embodiments, the different positions and structures of the present invention are described separately in each of the embodiments. However, it is the full intention of the inventors of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A cantilever displacement cargo carrier comprising:
a beam mounted on a vehicle, the beam having a first end and a second end, where the first end comprises a cantilever displacement housing with a pivot hole;
a pivot beam having a first end and a second end, where the first end comprises a pivot bushing and a slide compartment where an upper adjustable bearing slide is in contact with a lower adjustable bearing slide, the upper adjustable bearing slide having at least two pin saddles and the lower adjustable bearing slide having a threaded adjusting bolt receiver;
where a horizontal bearing pin having a plurality of roller bearings is inserted into the at least two pin saddles;
where an adjusting bolt is inserted into the threaded adjusting bolt receiver of the lower adjustable bearing slide;
and where a pivot pin is inserted into the pivot hole and the pivot bushing.

2. The cargo carrier of claim 1 where the beam further comprises a vehicle trailer hitch receiver.

3. The cargo carrier of claim 1 where the pivot beam further comprises a cargo platform.

4. The cargo carrier of claim 1 where the pivot beam further comprises a tire carrier.

5. The cargo carrier of claim 1 where the pivot beam further comprises a carrier for bicycles or electric bikes.

6. The cargo carrier of claim 1 where the second end of the beam comprises a receiver saddle with an anchor hole and the second end of the pivot beam comprises an anchor bushing;

where a retainer pin is insertable into the anchor hole and the anchor bushing to lock the pivot beam to the receiver saddle.

7. The cargo carrier of claim 1 where the pivot beam has a top surface and the plurality of bearings have an outer circumference that extends above the top surface of the pivot beam and contacts the cantilever displacement housing.

8. A vehicle lift comprising:

a beam mounted on a vehicle, the beam having a first end and a second end, where the first end comprises a cantilever displacement housing with a pivot hole;

a pivot beam having a first end and a second end, where the first end comprises a pivot bushing and a slide compartment where an upper adjustable bearing slide is in contact with a lower adjustable bearing slide, the upper adjustable bearing slide having at least two pin saddles and the lower adjustable bearing slide having a threaded adjusting bolt receiver;

where a horizontal bearing pin having a plurality of roller bearings is inserted into the at least two pin saddles;

where an adjusting bolt is inserted into the threaded adjusting bolt receiver of the lower adjustable bearing slide;

and where a pivot pin is inserted into the pivot hole and the pivot bushing;

the vehicle lift further comprising two lifting arms and two support arms pivotally attached;

where the lifting arms are each pivotally attached to a platform shoe and where the support arms are attached to vertical rotation cups;

a vehicle platform pivotally mounted on four pivot arms; where the lifting arms and support arms form sides of a first parallelogram and the pivot arms form sides of a second parallelogram; and, a drive with a first end and a second end, where the first end is attached to the beam and where the second end is attached to a crossbar mounted between the two lifting arms.

9. The vehicle lift of claim 8 where the beam is mounted to a vehicle at a vehicle trailer hitch receiver.

10. The vehicle lift of claim 8 where the beam is mounted to a vehicle at a vehicle hitch plate.

11. The vehicle lift of claim 8 where the beam is mounted to a vehicle at a vehicle frame by vehicle frame mounting plates.

12. The vehicle lift of claim 8 where the beam is mounted to a vehicle at a position selected from the group consisting of: a vehicle hitch plate, a vehicle frame by vehicle frame mounting plates, or a vehicle trailer hitch receiver.

\* \* \* \* \*